United States Patent [19]

Everitt

[11] 4,221,059
[45] Sep. 9, 1980

[54] SOLAR FOOD DRYER

[75] Inventor: Stanley K. Everitt, Ft. Collins, Colo.

[73] Assignee: Solar Saver International, Denver, Colo.

[21] Appl. No.: 750,889

[22] Filed: Dec. 15, 1976

[51] Int. Cl.² ............................................. F26B 19/00
[52] U.S. Cl. ........................................ 34/93; 34/193; 34/195; 126/452
[58] Field of Search .................... 34/93, 192, 193, 194, 34/195; 99/483; 312/306, 307, 236, 312; 220/345; 211/175, 176, 82; 126/452

[56] References Cited

U.S. PATENT DOCUMENTS

| 68,459 | 9/1867 | Rice | 34/93 |
|---|---|---|---|
| 1,233,974 | 7/1917 | Burlew | 34/93 |
| 1,404,632 | 1/1922 | Morgan | 34/195 |
| 2,035,340 | 3/1936 | Primavera | 220/345 |
| 2,093,277 | 9/1937 | Keighley | 312/236 |
| 2,107,076 | 2/1938 | Mason | 312/236 |
| 3,155,462 | 11/1964 | Erickson et al. | 34/82 |
| 3,179,314 | 4/1965 | Hodgson et al. | 220/345 |
| 3,630,344 | 12/1971 | Bergh et al. | 220/345 |

FOREIGN PATENT DOCUMENTS 882642  3/1943  France ........................................ 34/93

Primary Examiner—Larry I. Schwartz
Attorney, Agent, or Firm—Hugh H. Drake

[57] ABSTRACT

A box-shaped housing has side and end walls together with a back wall, leaving an opening at its front. A cover of material transparent to sunlight removably closes the front. Inside are a plurality of shelves mounted so as to be tilted at an angle with respect to the end walls. The housing is supported in a stationary position with its back wall tilted backwardly from the top so as to orient the removable shelves substantially in a horizontal position. A plurality of apertures in the housing enable air flow upwardly therethrough.

3 Claims, 7 Drawing Figures

SOLAR FOOD DRYER

The present invention pertains to a solar food dryer. More particularly, it relates to a self-contained unit in which foodstuffs might be place for drying by means of radiation from the sun.

For centuries, various foodstuffs have been dried in sunlight for the primary purpose of preservation. Once suitably dried, such foodstuffs ordinarily may be kept safely for at least many months without refrigeration. A familiar example is beef jerky, somewhat of a staple for the person travelling by foot or horseback for many days in wilderness areas. Solar drying has also been used to perserve many other meats as well as numerous fruits, vegetables, herbs and teas.

A typical early approach was to prepare the foodstuff into thin slices or strips and then expose it to sunlight by spreading it out in the open on a flat surface. That simple approach can indeed produce a suitable result. However, it must be monitered carefully in order to achieve sufficiently fast heating to effect proper drying, while at the same time avoiding excessive heating which would tend to cook rather than merely dry or dehydrate. Moreover, open drying requires attention to protect against precipitation. In addition, the materials must be brought inside at night to guard against condensation or dew.

Recognizing the practical limitations inherent in drying by such mere open exposure, as well as attendant problems with the attraction of insects and subjugation to wind-carried contaminates, various enclosures have been devised into which foodstuffs to be dried are placed. Of course, such enclosures do protect against insects and contaminates. They also function somewhat as an oven, having a transparent cover, or the like, to admit sunlight. The shape of the enclosure is selected to obtain, hopefully, uniform heat level throughout its confines. A typical such enclosure may have a plurality of shelves in which the foodstuff is distributed for drying. In at least one such prior enclosure, it has been recognized that the provision of an underlying black surface is beneficial for the purpose of absorbing heat energy from the radiating sunlight.

Such enclosures have indeed permitted a much more consistent program of drying foodstuffs than is available by means of mere open-air drying. Nevertheless, the typical prior approach, using an enclosure, has still required the need for rather constant monitoring in order to achieve uniform and proper results. Adequately-fast drying without actual cooking has continued to be a problem.

It is, therefore, a general object of the present invention to provide a new and improved solar food dryer which assists in overcoming the deficiencies adverted above with respect to prior apparatus of the same general kind.

Another object of the present invention is to provide a new and improved solar food dryer which meets the necessary criteria of performance while still being comparatively simple in terms of manufacture and utilization.

In accordance with the present invention, a solar food dryer includes a box-shaped housing that has a pair of mutually space-opposed side walls, a pair of mutually space-opposed end walls individually joining respecting end margins of the side walls and a back wall the peripheral margins of which are joined with the corresponding rear margins of the side and end walls so as to close the rear of the housing. The forward margins of the side and end walls define an opening extending substantially across the front of the housing. The material of all these walls is substantially opaque to sunlight. A cover is dimensioned to span the opening and is formed of a material that is transparent to sunlight. The cover is removably secured in closing relationship to that opening. A plurality of shelves each are of the width that spans the distance between the side walls and of a depth that substantially spans the distance between the rear and forward margins of the side walls when tilted at a predetermined angle with respect to the end walls. The shelves are spaced in succession between the end walls and each shelf is tilted at the aforementioned angle. The housing is supported in a stationary position with the back wall tilted backwardly from its top to orient the shelves substantially in a horizontal position. Finally, there are apertures in the housing for enabling air flow upwardly therethrough when the housing is in a stationary position.

The features of the present invention which are believed to be patentable are set forth with particularity in the appended claims. The organization and manner of operation of the invention, together with further objects and advantages thereof, may best be understood by reference to the following description taken in connection with the accompanying drawings, in the several figures of which like reference numerals identify like elements, and in which:

Figure 1:
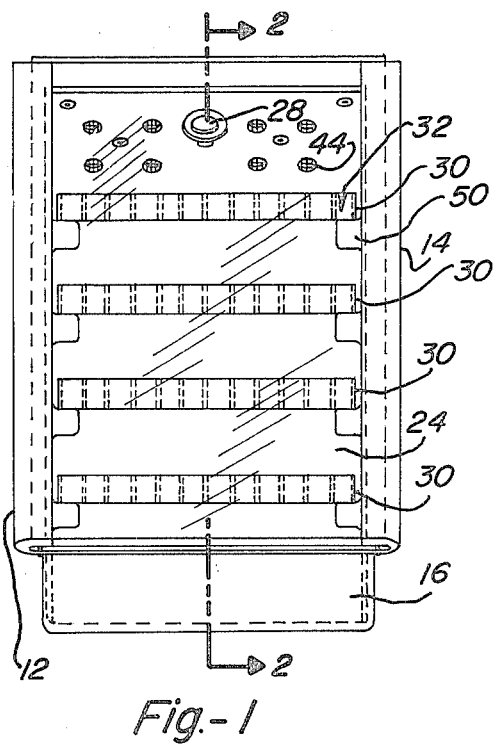
FIG. 1 is a front-elevational view of one embodiment of a solar food dryer.
Figure 2:
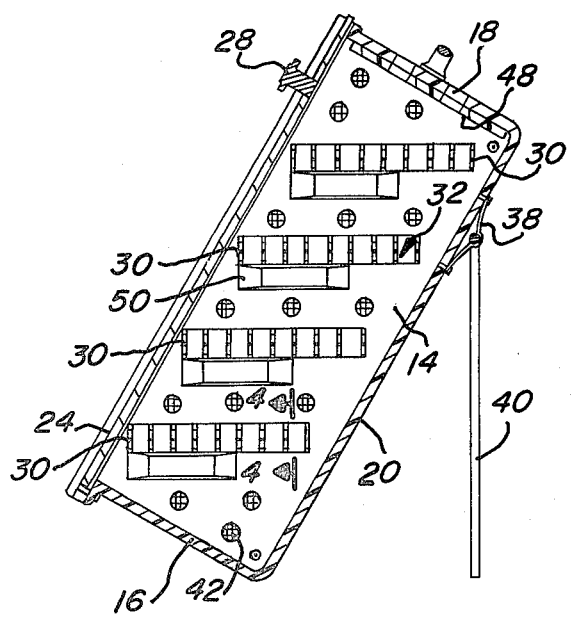
FIG. 2 is a cross-sectional view taken along the line 2—2 in FIG. 1.
Figure 3:
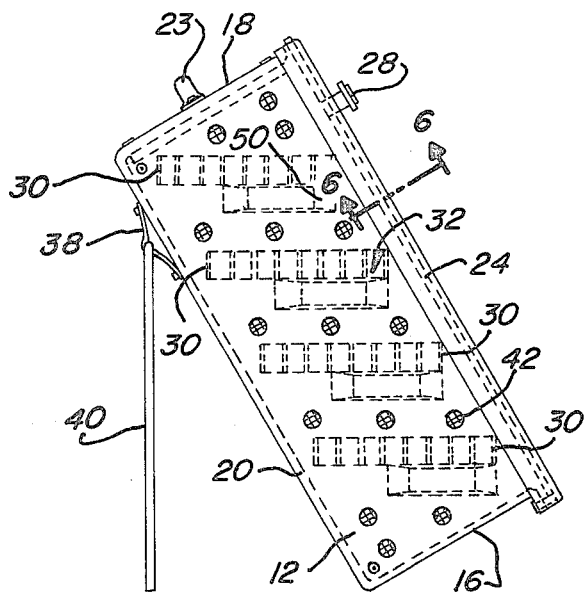
FIG. 3 is a side-elevational view of the embodiment shown in FIG. 1.

As shown in the drawings, a solar food dryer includes a box-shaped housing 10 that has a pair of mutually space-opposed side walls 12 and 14. A pair of mutually space-opposed end walls 16 and 18 individually join respective end margins of side walls 12 and 14. A back wall 20 has its peripheral margins joined with corresponding rear margins of side and end walls 12–18 to close the rear of the housing. The forward margins of side and end walls 12–18 define an opening 22 that extends substantially across the front of housing 10. The material of all of the aforesaid walls 12–20 is substantially opaque to sunlight and also is colored black in order to be absorbtive of that sunlight. A handle 23 conveniently is affixed to the outer surface of end wall 18.

A cover 24 is dimensioned to span opening 22 and is of a material that is substantially transparent to sunlight. Preferably, it is a transparent plastic such as Lucite. However, other materials, including clear glass, may be employed for the cover. In any case, cover 24 is secured in removable closing relationship to opening 22. To that end, mutually-facing U-shaped slots 26 are integrally formed in the forward marginal portions of respective ones of side walls 12 and 14. Thus, cover 24 is received slideably within slots 26 so as to form a transparent closure across the front of housing 10. To facilitate manipulating cover 24, it includes a knob 28.

A plurality of shelves 30 are each of a width which substantially spans the distance between side walls 12 and 14 and are of a depth to span substantially the distance between the rear and forward margins of side walls 12 and 14 when the shelves are tilted at a predetermined angle, in this specific case 45 degrss, with respect to end walls 16 and 18. Shelves 30 are removably mounted within housing 10 in spaced succession between end walls 16 and 18 with each shelf tilted at that angle.

Each of shelves 30 is formed to define a plurality of air passages 32 distributed throughout the individual shelf. To that end, shelves 30 are formed of a first plurality of webs 34 spaced successively in the direction of the shelf width and a second plurality of webs 36 individually spaced successively in the direction of shelf depth. Those webs 34 and 36 mutually intersect to define the array of air passages 32. Shelves 30, including webs 34 and 36, are of a color reflective of sunlight. As preferred, shelves 30 are molded from white plastic material.

Secured to back wall 20 by a bracket 38 is a tilt stand 40 that supports housing 20 in a stationary position with back wall 20 tilted backwardly from its top so as to orient shelves 30 substantially in a horizontal position. Bracket 38 permits tilt stand 40 to be folded against back wall 20 for storage for shipping purposes. With shelves 30 tilted at a preferred angle of 45 degrees to either of end walls 16 and 18, tilt stand 40 also defines an angle of that magnitude with respect to back wall 20.

Defined in housing 20 are a plurality of apertures that enable air flow upwardly through the housing when the latter is in its stationary tilted position supported by stand 40. A first plurality of apertures 42 are distributed in side walls 12 and 14 with individual different ones of those apertures being adjacent to respective ones of shelves 30. A second plurality of apertures 44 are distributed in end wall 18 which is uppermost when housing 20 is in its stationary position supported in a tilting relationship by stand 40.

All of apertures 42 and 44 are screened by a mesh transmissive of air flow but protective against the passage of insects. To that end in the particular embodiment shown, such screening is in the form of a continuous layer 46 of mesh material sandwiched in place over the various apertures by means of an inner wall 48 of housing 20. In this case, inner wall 48 is disposed on the inner surfaces of both side walls 12 and 14 as well as on the inner surface of uppermost end wall 18. Advantageously, inner wall 48 is formed to include elongated lugs 50 that project integrally into the interior of housing 20 and serve as the supports for shelves 30.

All of apertures 42 and 44 are so distributed and assigned a total cross-sectional area of an amount that enables a flow of air at a rate which limits the temperature within housing 10, with cover 24 in closing relationship when exposed to direct sunlight, to a maximum value of approximately one-hundred-forty degrees (140°) Fahrenheit. This limitation is achieved by providing sufficient air flow, encouraged by chimney effect through the housing, to prevent excessive heat build-up that otherwise would cause cooking instead of mere drying. Of course, the total aperture area for any given set of dimensions of housing 10 is something that must be determined emperically. As an example, however, the drawings accurately represent one form a solar dryer which has proved successful. It will be noted that there are three of apertures 42 associated respectively with each of shelves 30 plus an extra set of three apertures in the upper portion of each of side walls 12 and 14. In the unit depicted, the depth was four and one-quarter inches, the heighth was thirteen inches and the width was eight inches. There also were a total of eight apertures 44 in upper end wall 18. All of apertures 42 and 44 were one-half inch in diameter. Another unit of substantially greater size had seven of shelves 30 and included a housing which was five and one-quarter inches in depth, twenty inches high and ten and three-quarters inches wide. In that case, apertures 42 were disposed in numbers of four with respect to each shelf together with an additional four at the top portion of each side wall, and those apertures were likewise of a diameter of one-half inch. The upper end wall, in that enlarged case, included twelve apertures of the same size. The point is that, whatever the size, the number and size of air-flow apertures, for a given size of enclosure, is selected so that an interior temperature of the order of one-hundred-twenty degrees Fahrenheit is achieved upon exposure of cover 24 to direct sunlight. Too little air flow would mean excessive temperature within the interior, an interior temperature in excess of one-hundred-forty degrees resulting in unnecessary cooking as contrasted with desired drying.

On the other hand, excessive total aperture area could result in insufficient temperature level to accomplish the desired drying. Drying appears to occur adequately at any temperature over seventy degrees, but such a low temperature results in much slower drying. With the aforementioned specific relationships, it has been found that an interior temperature of between one-hundred-twenty and one-hundred-thirty degrees is obtained in direct sunlight at an outside temperature of fifty-five degrees, while the interior temperature remained at a value below one-hundred-forty degrees even when the outside ambient temperature reached as much as one-hundred-four degrees, all Fahrenheit. It appears that the basic color combination, of a black housing and white shelves in the preferred embodiment, contributes to the maintenance of proper temperature. Even when shelves 30 are initially rather tightly packed with the foodstuff being dried, it has been found that shrinkage of the foodstuff soon exposes sufficient of the reflective white color of the shelves to assist in keeping the overall interior temperature at the correct level. Of course, the air passages and the different apertures enable a convection-type flow of air which not only assists in maintaining proper temperature values but also enables the necessary egress of moisture.

Figure 4:
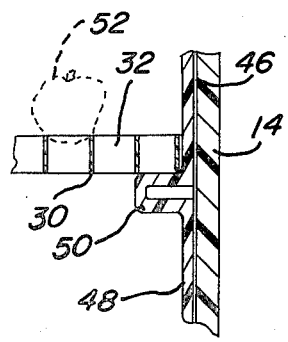
FIG. 4 is a fragmentary cross-sectional view taken along the line 4—4 in FIG. 2.
Figure 5:
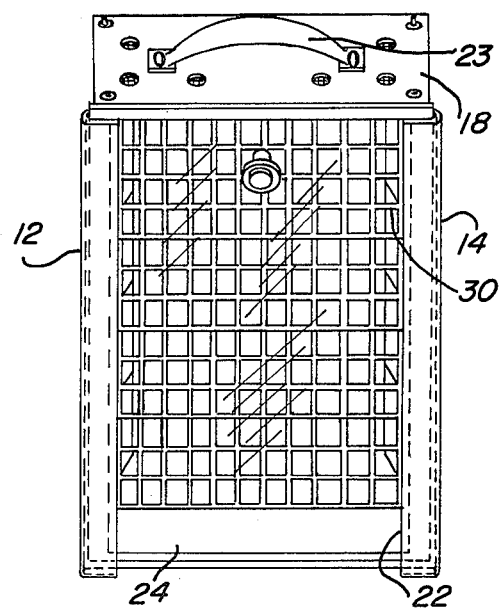
FIG. 5 is another front-elevational view of the embodiment of FIG. 1 but taken from an elevated angle.
Figure 6:
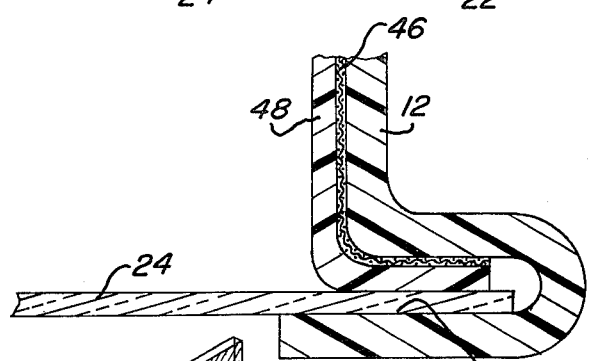
FIG. 6 is a fragmentary cross-sectional view taken along the line 6—6 in FIG. 3.
Figure 7:
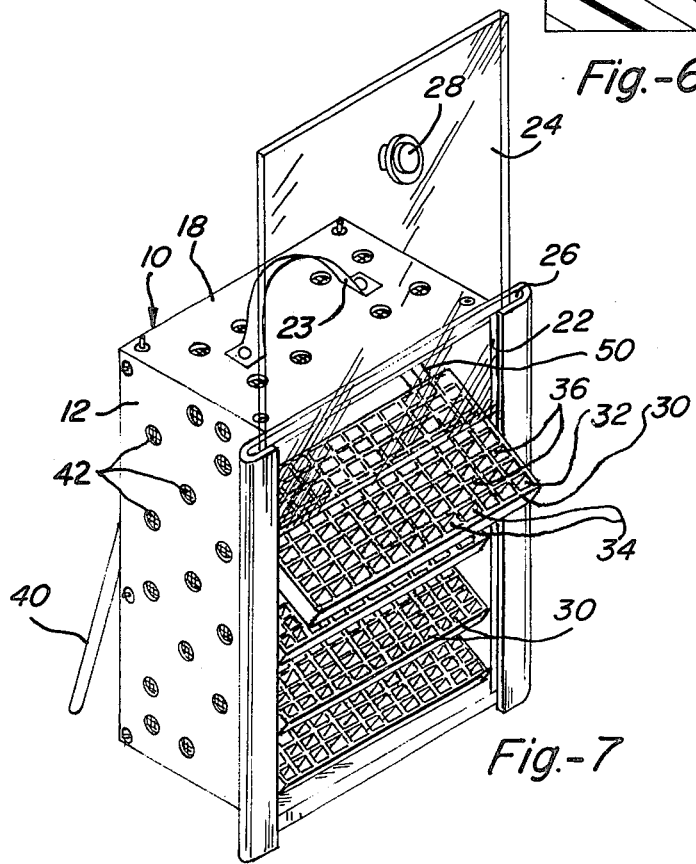
FIG. 7 is a perspective view of the embodiment of the preceding figures and with certain components disposed in a different position.

In use, any fruit, vegetable, meat, herb or spice can be dried. A piece of fruit 52 is illustrated by phantom outline in FIG. 4. However, citrus fruits, lettuce and watermelon do not seem to be recommended. To initiate the operation, the entire unit usually is loaded at a convenient place and then placed in a position so as to expose panel 24 to the sun. One sunny day is usually sufficient to dry most fruits. Most common vegetables take only between three and five hours, although pithy vegetables, such as corn, beans and peas, may take longer. Most meats, if thinly sliced, take only three or four hours, although stew meats may require a long day of drying. Once the drying operation is completed, the dried food should be stored in an air-tight container at moderate temperatures, as no more than sixty degrees Fahrenheit.

The unit described is particularly efficacious in facilitating the loading and unloading of the foodstuffs. At the same time, its combination of features coact so as to enable drying at a rapid rate and yet without undue danger of overheating so as to result in undesired cooking instead of drying. As will be observed, all components are capable of being manufactured simply and efficiently through the basic use of a molding approach.

While a particular embodiment of the invention has been shown and described, it will be obvious to those skilled in the art that changes and modifications may be made without departing from the invention in its broader aspects, and, therefore, the aim in the appended claims is to cover all such changes and modifications as fall within the true spirit and scope of the invention.

I claim:

1. A solar food dryer comprising:

a box-shaped housing having a pair of mutually space-opposed side walls, a pair of mutually space-opposed end walls individually joining respective end margins of said side walls, a back wall the peripheral margins of which are joined with the corresponding rear margins of said side and end walls to close the rear of said housing and the forward margins of said side and end walls defining an opening extending substantially across the front of said housing, with the material of said walls being substantially opaque to sunlight;

a cover dimensioned to span said opening and of a material substantially transparent to sunlight;

means for securing said cover in removable closing relationship to said opening;

a plurality of shelves each of a width substantially spanning the distance between said side walls and of a depth to span substantially the distance between said rear and forward margins of said side walls when tilted at a predetermined angle with respect to said end walls;

means for removably mounting said shelves within said housing in spaced succession between said end walls with each shelf tilted at said angle;

means for supporting said housing in a stationary position with said rear wall tilted backwardly from its top to orient said shelves substantially in a horizontal position;

means defining apertures in said housing for enabling air flow upwardly therethrough when said housing is in said stationary position, said defining means establishing a first plurality of apertures distributed in said side walls with individual different one thereof being adjacent to respective different ones of said shelves and a second plurality of apertures distributed in the one of said end walls uppermost when said housing is in said stationary position, and said apertures being so distributed and having a total cross-sectional area of an amount enabling a flow of said air at a rate limiting the temperature within said housing, with said cover in said closing relationship and exposed to direct sunlight, to a minimum value of approximately one hundred-forty degrees Fahrenheit;

screening disposed across said apertures and of a mesh transmissive of air flow but protective against the passage of insects, said screening being in the form of a continuous layer of mesh material;

an inner wall of said housing disposed to sandwich said mesh material against the inner surfaces of said side walls;

and said mounting means including elongated lugs projecting integrally from said inner wall into the interior of said housing.

2. A dryer as defined in claim 1 in which said securing means includes mutually-facing U-shaped slots integrally formed in the forward marginal portions of said side walls, said inner wall having its forward marginal portions individually being folded into respective one of said slots.

3. A solar food dryer comprising:

a box-shaped housing having a pair of mutually space-opposed side walls, a pair of mutually space-opposed end walls individually joining respective end margins of said side walls, a back wall the peripheral margins of which are joined with the corresponding rear margins of said side and end walls to close the rear of said housing and the forward margins of said side and end walls defining an opening extending substantially across the front of said housing, with the material of said walls being substantially opaque to sunlight;

a cover dimensioned to span said opening and of a material substantially transparent to sunlight;

means for securing said cover in removable closing relationship to said opening;

a plurality of shelves each of a width substantially spanning the distance between said side walls and of a depth to span substantially the distance between said rear and forward margins of said side walls when tilted at a predetermined angle with respect to said end walls;

means for removably mounting said shelves within said housing in spaced succession between said end walls with each shelf tilted at said angle;

means for supporting said housing in a stationary position with said rear wall tilted backwardly from its top to orient said shelves substantially in a horizontal position;

means defining apertures in said housing for enabling air flow upwardly therethrough when said housing is in said stationary position, said defining means establishing a first plurality of apertures distributed in said side walls with individual different ones thereof being adjacent to respective different ones of said shelves and a second plurality of apertures distributed in the one of said end walls uppermost when said housing is in said stationary position, and said apertures being so distributed and having a total cross-sectional area of an amount enabling a flow of said air at a rate limiting the temperature within said housing, with said cover in said closing relationship and exposed to direct sunlight, to a maximum value of approximately one hundred-forty degrees Fahrenheit;

each of said shelves being formed to define a plurality of air passages distributed throughout the shelves;

and each of said shelves being formed of a first plurality of webs individually spaced successively in the direction of said width and a second plurality of webs individually spaced successively in the direction of said depth, said first and second pluralities of webs mutually intersecting to define an array of air passages.

* * * * *